United States Patent Office.

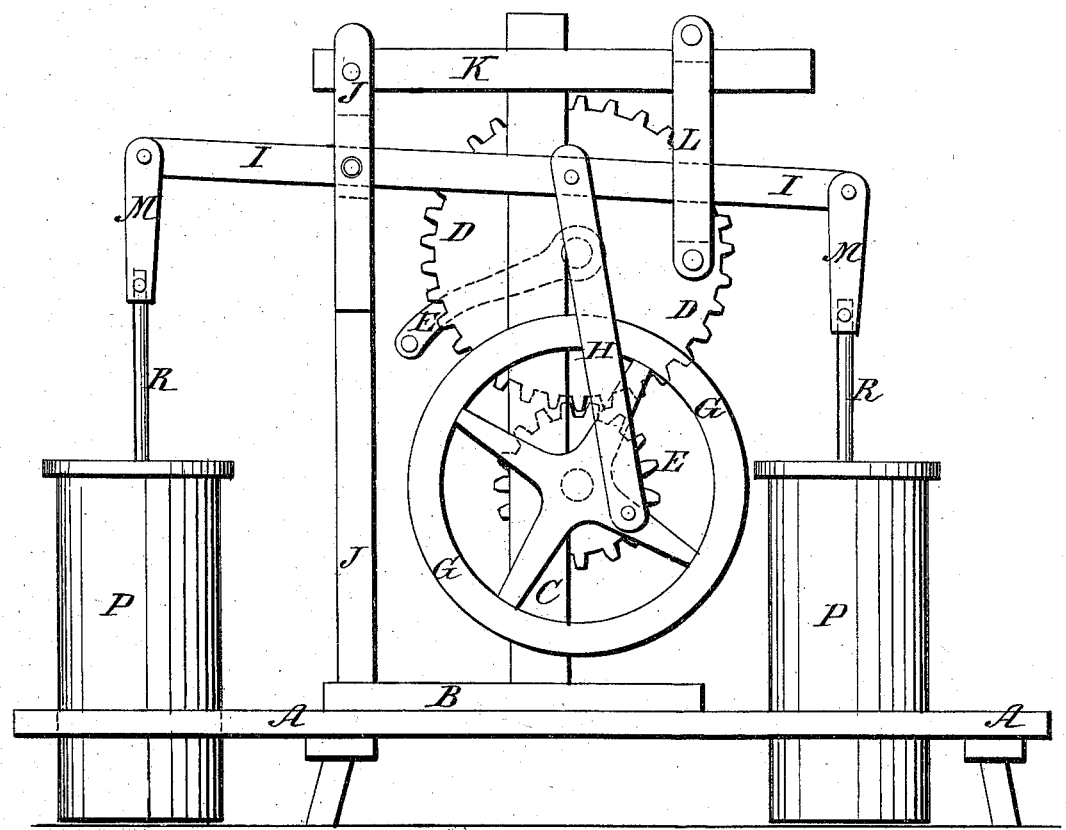

SAMUEL D. LUCAS, OF WINTERPOCK, VIRGINIA.

Letters Patent No. 95,029, dated September 21, 1869.

IMPROVEMENT IN CHURNS.

The Schedule referred to in these Letters Patent and making part of the same.

*To all whom it may concern:*

Be it known that I, SAMUEL D. LUCAS, of Winterpock, in the county of Chesterfield, and State of Virginia, have invented a new and useful Improvement in Churning-Machines; and I do hereby declare that the following is a full, clear, and exact description thereof, which will enable others skilled in the art to make and use the same, reference being had to the accompanying drawing, forming part of this specification.

The figure is a side view of my improved churning-machine.

A is a low bench or platform, supported upon short l.gs, and having one or two holes formed through it near its ends, to receive the churns, according as one or two churns are to be used.

B is the bed or foundation-plate, which supports the operating-parts of the machine, and which is securely attached to the middle part of the bench or platform A.

C are two uprights, the lower ends of which are securely attached to the rear part of the bed B, and the upper ends of which are connected to each other by a short cross-bar.

D is a large gear-wheel, placed between the posts or uprights C, and the journals of which revolve in bearings attached to the sides of the said posts.

To the rear end of the journal of the gear-wheel D is attached a crank, E, by means of which the churn is operated. The teeth of the gear-wheel D mesh into the teeth of the small gear-wheel E, placed between the lower parts of the posts C, and the journals of which revolve in bearings attached to said posts.

To the forward end of the journal of the small gear-wheel E, is attached a large balance-wheel, G, which also serves as a crank-wheel.

To the crank-pin of the wheel G is pivoted the lower end of the connecting-rod H, the upper end of which is pivoted to the lever or working-beam I.

The lever I is pivoted in the slotted upper part of the upright or post J, the lower end of which is secured to the bed B, and the upper end of which is connected with the posts C by the bar K.

The bar K projects beyond the posts C, and to its projecting part is attached a slotted guide, L, through which the lever I passes, so that the said lever may always move vertically.

To one or both of the ends of the lever I are pivoted sockets M, which receive the upper ends of the dasher handles of the churns to be operated, where they are detachably secured in place by a pin passing through a hole through the lower part of the said sockets, and through a hole in the upper part of the said dasher handles.

Having thus described my invention,

What I claim as new, and desire to secure by Letters Patent, is—

The construction and arrangement of the churns P, bench A, bed B, posts C and J, bar K, guide L, connecting-rod H, fly-wheel G, small gear-wheel F, large gear-wheel D, crank E, the lever I, sockets M, and dasher-rods R, as herein shown and described.

SAMUEL D. LUCAS.

Witnesses:
I. A. MANN,
G. H. ROBERTSON.